Nov. 14, 1961 G. H. JONES 3,008,381
METHOD AND MEANS OF MACHINE SUPPORT
Filed Jan. 2, 1958 7 Sheets-Sheet 1

Fig. 1

INVENTOR
GORDON H. JONES
by: Carlson, Pitzner, Hubbard & Wolfe
ATTYS.

United States Patent Office 3,008,381
Patented Nov. 14, 1961

3,008,381
METHOD AND MEANS OF MACHINE SUPPORT
Gordon H. Jones, Fond du Lac, Wis., assignor to Giddings & Lewis Machine Tool Company, Fond du Lac, Wis., a corporation of Wisconsin
Filed Jan. 2, 1958, Ser. No. 706,693
11 Claims. (Cl. 90—15)

This invention relates to machines such as machine tools, and more particularly to means for supporting a machine whereby its precision alinements may be maintained.

While this invention is of general application to massive machines having heavy, movable components, it finds particular, but not exclusive, utility with large machine tools such as boring, drilling and cutting machines having large, traversable headstocks, where it is essential in order to operate the machine to maintain the precision alinements for all positions of the headstocks.

In the machine tool field, particularly in the case of large machine tools, it has been the common practice heretofore to use static support elements such as manually adjustable leveling blocks or jacks in order to level and aline the machine on the foundation and to bear its weight. In order to carry the large loads involved, it has been the usual practice to employ these support elements or leveling blocks and to construct an extremely thick reinforced concrete foundation with footings carried to a proper soil or bottom, for carrying the machine weight via these leveling blocks.

As a result of using manually adjustable support elements for alinement purposes, the weight of the machine rather than being transmitted evenly to the foundation over its entire area, is transmitted to the foundation at points of high stress intensity under the individual elements. Moreover, during operation of a machine such as a machine tool, movement of the components, for example the headstocks, from one side of the machine to the other, results in changes in the weight distribution on the different support elements and corresponding changes in the stress intensity in localized areas under the support elements in the foundation. In other words, when the machine is operating and movements of the major components occur, the support elements under the frame of the machine are dynamically loaded. It has been found that the dynamic or changing load carried by each of the support elements produces deflection changes within the support elements and also in the foundation areas associated with each support element, which affect the alinements of the machine.

Accordingly, the method of machine support now proposed is primarily concerned with relieving the static support elements and foundation areas from deflection producing changing loads under operating conditions, and it is contemplated this new method will be followed after all practical steps have been taken to obtain maximum resistance to deflection by increased stiffness and rigidity of the machine frame members.

It is a general object of the present invention to provide a method and means for supporting the machine dynamically which will be conducive to reducing deflections affecting precision alinements of the machine.

Another object is to provide dynamic machine supports effective to substantially relieve the static support elements from the effect of changing load, resulting in drastic reductions in deflection changes of these static support elements and of the underlying foundation areas. A related object is to provide power operated dynamic supports for this purpose.

Another object of the invention is to provide for the controlled supply of power to the dynamic supports for the machine frame so that the same may be automatically effective to relieve the static supports, such as leveling blocks or jacks, from the effects of the changing portion of the total load carried by each of them.

A more specific object of the invention is the provision of a hydraulic system for operating dynamic supports in the form of hydraulically operated pistons, and embodying an automatic control which regulates the power fluid supplied to the dynamic support pistons.

Other and additional objects will appear from the following description taken in connection with the accompanying drawings, wherein.

While the invention is susceptible of various modifications and alternative constructions, a preferred embodiment has been shown in the drawings and will be described below in considerable detail along with certain modifications of the invention. It should be understood, however, that there is no intention to limit the invention to the specific forms disclosed, but, on the contrary, the intention is to cover all modifications, alternative constructions and equivalents falling within the spirit and scope of the appended claims.

GENERAL MACHINE ORGANIZATION

Upon more specific reference to the drawing, it will be perceived that the invention is exemplified as a means for supporting an illustrative machine built in the form of a large, high-speed, boring, drilling and cutting machine tool such, for example, as the one disclosed in the copending application of Jesse Daugherty, Serial No. 532,172, filed September 2, 1955, now Patent No. 2,899,869. As shown more particularly in FIGURE 1, the machine comprises a frame including spaced upstanding columns 22, 23, and a bed 24 for slidably supporting a table 25 on which a workpiece is adapted to be carried for machining purposes. The table 25 is reciprocable longitudinally of the bed as by means of an appropriate variable speed drive (not shown). The spaced columns 22, 23 straddle the bed and are located at the central region thereof. Spanning the columns is the cross-rail 27 on which a plurality of headstocks 28, 29 are mounted for horizontal traverse therealong. The headstocks are adapted for processing a workpiece carried on the table, being mounted, controlled and equipped with appropriate cutters for this purpose. In the present instance, the rail 27 is slidably carried on the front of the columns 22, 23, by means of vertical guideways and may be raised or lowered for adjustment purposes by rail elevating screws 26, 26' which are part of the frame.

Individually powered headstocks of the type shown mounted on the cross-rail for horizontal traverse thereon, may weigh more than 3½ tons each. Transfer of this headstock weight to the columns is obtained by means of a headstock suspension system shown in FIGS. 2 and 3 to comprise a beam 30 supported by counter-balancing chains 31, 32 trained over the upper extremities of the columns 22, 23. While the total weight supported by both columns remains constant, as the heads move along the rail their weight is shifted from one column to the other. Therefore, the weight carried by each column 22, 23, varies depending upon the horizontal position of the headstocks 28, 29.

Figure 1:
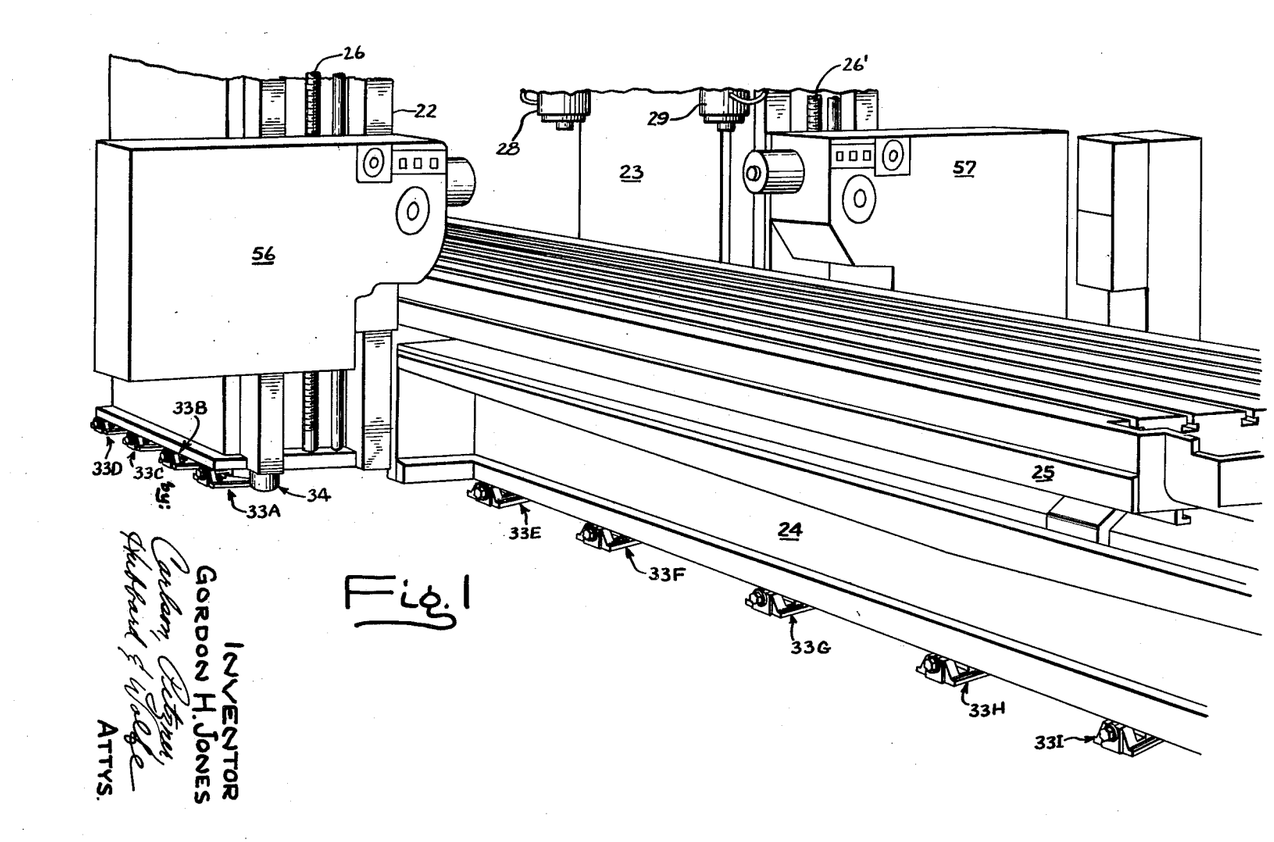
FIGURE 1 is a perspective view of a machine resting on a foundation.

Referring to FIGURE 1, the bed and columns of the machine rest on a deep, reinforced concrete foundation. Following standard practice, leveling blocks or jacks 33A–I are located under the machine tool frame at spaced points and comprise static machine frame supports which are adjustable for alinement purposes.

In view of the substantial length of the machine tool bed, the leveling blocks 33E–I under the bed are spaced every 2' to 3', to prevent sag or appreciable bending. Under the foot of the machine columns 22, 23, due to the great weight of the members supported thereby, the spacing of the leveling blocks 33A–D is reduced to approximately every 18". Thus the weight of the frame of the machine, including the bed, table columns, rail and beam, as well as the weight of the headstocks, is borne by the series of leveling blocks 33A–I and transmitted to the underlying foundation.

Under operating conditions, as the headstocks 28, 29 move across the rail 27, and the center of gravity thereof shifts relative to the upstanding column structure 22, 23, the distribution of weight between the individual leveling blocks 33A–D resting on the foundation under the base of the columns 22, 23 and supporting the same, changes correspondingly. The weight supported by the leveling blocks 33A–D carrying the columns varies from a minimum to a maximum depending on the location of the headstocks and the variation is continuous during headstock movement. In other words, these leveling blocks 33A–D are dynamically loaded. Moreover, since it is often necessary to shift both headstocks to one end of the rail, so that substantially all the weight of the two headstocks is carried by a single column, the change in load on the columns approaches as a maximum the total weight of the two headstocks.

By observation, therefore it has been concluded that the loading on the static support elements 33A–D carrying the columns may be considered as comprising a fixed and a changing portion. In general, the fixed load borne by such a support element and the localized underlying foundation area is that minimum load due to the apportioned weight of the non-moving members of the machine, such as the frame plus the minimum weight sustained of the moving members such as the headstocks. It has been assumed, for purposes of explanation, that with both headstocks at one end of the rail the weight on the opposite column and attributable thereto is zero pounds, and the weight on the column at the heavy end of the rail is substantially the total weight of the two headstocks. Therefore, the changing load on each support element under the columns varies from zero to a maximum and when added to the fixed load makes up the total load carried by a particular support element under a given set of conditions. While other movable components than the headstocks are present on the illustrative machine, from a comparison standpoint the weight of such components is relatively small and has been ignored for explanation purposes.

With the development of larger machine tools, such as the illustrative machine shown in the drawings, even with a tool carrying structure consisting of a rigid and stiff frame, which is bolted securely to the bed and supported on a firm foundation, some minimum variations in parallelism in the frame members cannot be avoided. Therefore, it will be appreciated that additional deflection changes in the support elements and foundation, such as may be produced by changing load due to movement of the major components, must be held to an absolute minimum if close tolerances are to be producible in work processed on the machine.

It has been discovered that by substantially relieving the static support elements 33A–D from the effect of changing load, so that each element carries only a substantially fixed load which is transmitted to the underlying foundation area, deflections in the support elements and in the foundation may be drastically reduced under operating conditions.

In accordance with the present invention, therefore, provision is made for relieving the static supports under the columns, from the effect of changing load by supporting the changing load by means of dynamic load supports. For carrying out the foregoing an arrangement is used wherein the leveling blocks 33A–D under the machine columns 22, 23 support only the portion of the machine weight which is fixed or static, and dynamic load supports 34, 35 under the front edges of the columns 22, 23, are employed for supporting the changing load. By following this invention, deflections in the static, adjustable, leveling elements and in the localized underlying foundation areas are avoided. Thus, by means of the support elements 33A–I, the entire machine frame including the tool supporting column structure may be leveled with great preciseness, and except for minor, unavoidable deflections in the frame, precision alinement requirements may be maintained during operation which is conducive to machining to close tolerances.

MACHINE FRAME SUPPORTS

Figure 5:
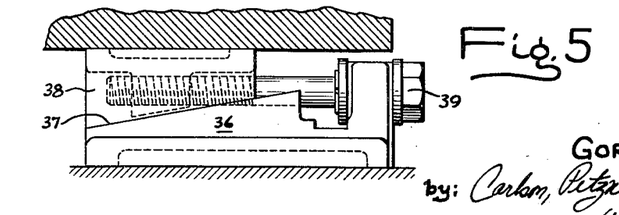
FIG. 5 is an enlarged view showing details of one of the adjustable static support elements employed for supporting the frame of the machine.

Referring more particularly to the foregoing machine frame support arrangement, it will be noted that the manually adjustable leveling blocks 33, as illustrated in FIG. 5, are made in two parts, including a base 36 resting on the foundation, presenting a sloping surface 37 on which a wedge-shaped upper part 38 is slidable so that it may be raised or lowered manually to vary the overall height of the block. A screw 39 accessible to the front of the block and rotatably mounted on the base is provided to draw the upper part along the sloping surface for adjustment purposes.

In keeping with the invention, hydraulic cylinders and pistons 34 under the vertical slide ways of each upstanding column provide dynamic support for the changing load imposed by the movable headstocks. In the present preferred arrangements, these hydraulic cylinders are placed under the outside ways 22', 23' on the face of the columns. Pressure fluid is supplied to these cylinders to obtain a lifting froce equal to the changing load which is sustained by the respective columns. With this arrangement, the upward pressure exerted by one of the dynamic load supports 34, 35 increases as the center of gravity of the headstocks 28, 29 shifts to increase the weight supported by the particular column having that dynamic support. Conversely, the upward pressure due to the other dynamic support decreases as the center of gravity of the headstocks shifts away from that particular column.

Figure 6:
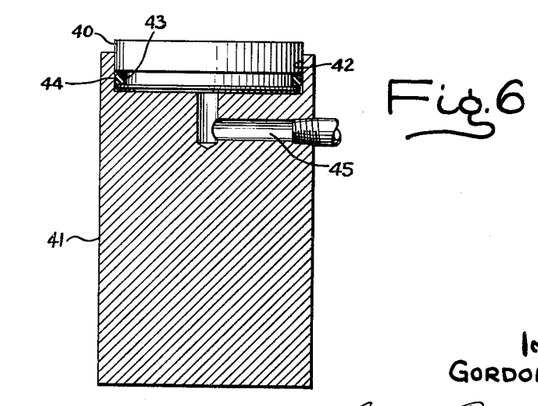
FIG. 6 is a sectional view of one of the dynamic supports employed under the frame of the machine.

The hydraulic support cylinders 34, 35 are similarly constructed as depicted in FIG. 6. As illustrated, the support comprises a cylinder block 41 which is adapted to be mounted on the foundation under the frame of the machine, and a piston 40 slidable in the bore of the block. Since the movement of the piston 40 is minute, as will be hereinafter described, the cylinder block 41 may be made, for example, of metal, and the bore 42 in the upper end to accommodate the piston 40 is required to be only of such length as to receive the piston. The piston 40 comprises, as shown, a flat, thick, disc fitting closely in the bore 42, and having an annular groove 43 for a resilient ring 44 provided for sealing purposes. Controlled pressure fluid is supplied under the piston by means of conduits 45 drilled in the cylinder block and leading to the bore 42.

CONTROL FOR DYNAMIC SUPPORTS

As an illustrative method of operating these dynamic supports 34, 35, a hydraulic circuit which is also used for operating the headstock suspension system is employed since this circuit constitutes a convenient source of power fluid, and includes a control which regulates certain outputs of the circuit in accordance with the distribution of headstock weight relative to the machine columns.

(a) The headstock suspension system

For the purpose of accommodating service and control lines or conduits carrying electricity, hydraulic pressure, cooling water and compressed air to the headstocks in a manner permitting them to be traversed along the cross-rail 28 without jeopardizing such lines, a multiple line feed is utilized. This feed, which is described more fully in the copending application of Jesse Daugherty, Serial No. 238,295, filed July 24, 1951, now Patent No. 2,892,388 is housed in the counterbalanced beam 30 (FIGS. 2 and 3) mounted on the cross-rail 27 in vertically spaced, overlying relation therewith.

In the present instance, the suspension system provides means for maintaining the beam 30 and the cross-rail 27 in parallelism with the table 25. For this purpose, the suspension system includes means for counterbalancing the headstocks mounted on the cross-rail, so as to relieve the cross-rail and elevating screws from this weight. In the illustrative system the headstocks 28, 29 are resiliently suspended from the beam 30 by hydraulically operated suspending units 47, shown in FIGS. 2, 3 and 7 as comprising trolleys 48 adapted to roll along the beam, and fastened to the individual headstocks by means of pistons 49 contained in cylinders 50. These suspending units provide a resilient connection between the beam 30 and the headstocks 28, 29, slidable along the cross-rail 27, to accommodate for deflection of the beam which temporarily destroys parallelism between the cross-rail and beam. For counterbalancing purposes, the beam 30 is suspended by the roller chains 31, 32 connected at each end to the beam and to respective hydraulic piston and cylinder type tensioning units 53, 54 at the foot of each column 22, 23. As previously described, the roller chains 31, 32 preferably pass over the upper extremities of the machine columns, 22, 23, being supported thereon by sprocket pulleys 55, thus transferring the weight of the headstocks and beam, and a portion of the weight of the cross-rail, to the columns.

A separate suspension or counterbalancing means is also provided for each side head 56, 57. The latter counterbalancing means is illustrated in FIGS. 2, 3 and 7 as including a separate hydraulic piston and cylinder tensioning mechanism 58, 59 for each of the said heads, located in the corresponding vertical columns 22, 23 and connected to the headstocks by means of roller chains 60, 61, or the like.

Figure 2:
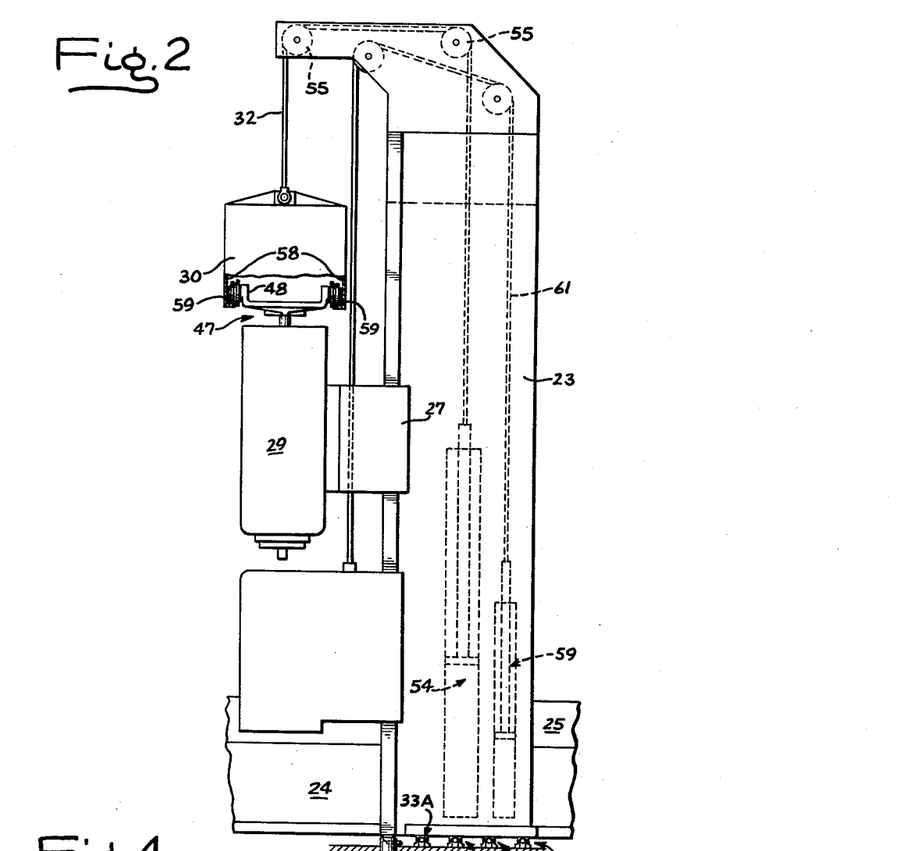
FIG. 2 is a side view of the machine of FIGURE 1.
Figure 3:
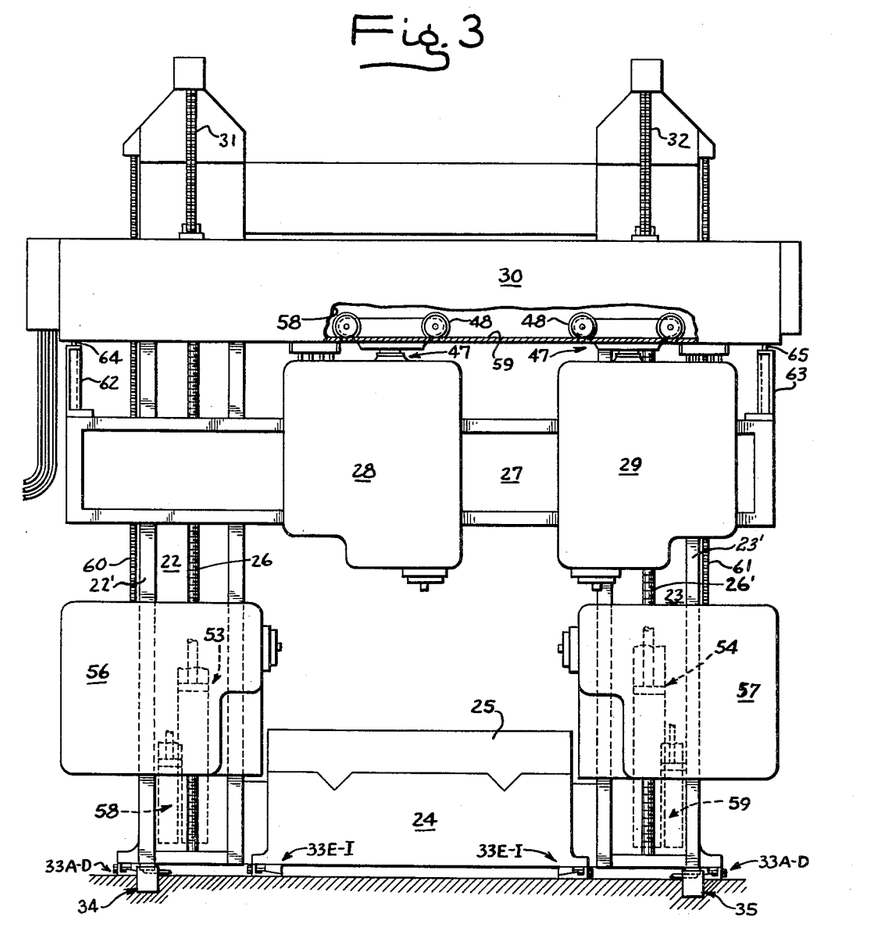
FIG. 3 is a front view of the machine shown in FIGURES 1 and 2.
Figure 4:
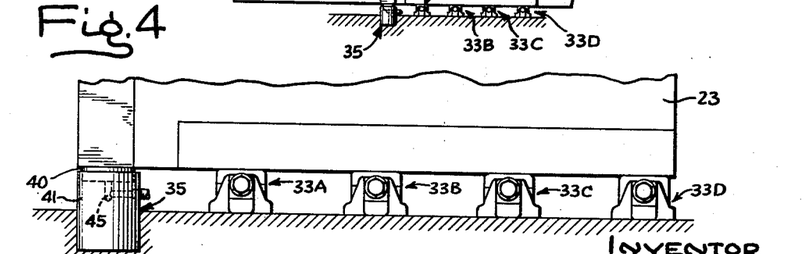
FIG. 4 is an enlarged fragmentary view of the foot of the frame of the machine shown in FIG. 2.
Figure 7:
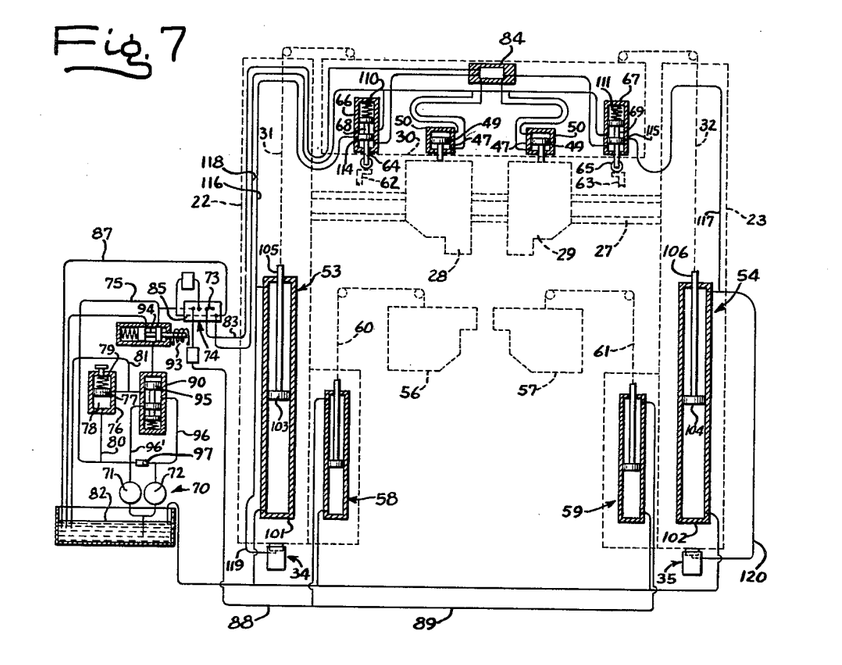
FIG. 7 is a diagram of a hydraulic system for operating the dynamic supports.

By referring to FIGS. 2, 3 and 7, it will be seen that the overhead beam 30 is of elongated box-like configuration formed by a pair of inwardly facing channel-shaped walls 58. Tracks 59 formed by the inwardly extending flanges on the bottom of the channels, support and guide the headstock trolley assemblies 48 from which are suspended the individual headstocks. As described previously, each trolley is constructed with a cylinder 50 in which a vertically reciprocable piston 49 is mounted, which piston is fastened to a piston rod extending downwardly through one end of the cylinder to be attached to the respective headstock by means of a bolt or the like. The resilient suspending units 47 are operated by pressure fluid supplied to the cylinders from a source of pressure fluid in the hydraulic circuit which forms part of the suspension system.

Thus it will be observed that the suspension system relieves the precision cross-rail of the headstock weight by providing an alternate means for transferring the weight of the headstocks to the columns. Furthermore, in counterbalancing the headstocks, the system takes into allowance the horizontal position of the headstocks on the cross-rail, supplying pressure fluid to the tensioning units 53, 54 in accordance with the distribution of headstock weight along the cross-rail. In the present case, the pressure fluid supplied to the tensioning units constitutes a source of controlled pressure fluid which may be utilized for operating the hydraulic pistons 40 which comprise the dynamic supports for the columns of the machine.

(b) Hydraulic circuit for headstock suspension system

It was previously mentioned that the suspension system provides means for insuring that the cross-rail 27 and the support beam 30 are disposed in parallelism with the table 25, and comprises for this purpose, an upstanding bracket 62, 63 adjacent each end of the cross-rail supported in a position to engage the depending valve stem 64, 65 of positioning valves 66, 67 mounted on the beam. The brackets 62, 63 may be adjusted with the rail, beam and table in parallelism, to engage the stems of the positioning valves 66, 67 so as to close the valves when the support beam 30 is suspended in the position at which it assumes the entire weight of the headstocks 28, 29, and a portion of the weight of the cross-rail 27. In this position, the headstock supporting pistons 49 are, in effect, floating in their respective cylinders 50 to provide the desired resilient connection between the support beam and the headstocks. Upon occurrence of a sag at one end and a rise at the other end of the beam 30, the valve spools 68, 69 of the positioning valves 66, 67 will be caused to move either upwardly or downwardly, and this movement of the spools is employed to control the pressure fluid in the tensioning units 53, 54. The beam 30 of the suspension system is so constructed that movement of the headstocks along the cross-rail produces a sag at the heavy end of the beam 30, and a corresponding rise at the opposite end. Thus the system includes a mechanism which, in effect, regulates the supply of pressure fluid to the tensioning units in accordance with the position of the headstocks along the cross-rail. By reason of this provision, as the fluid pressure in these tensioning units 53, 54 is caused to increase or decrease, the beam 30 will follow the movement of the cross-rail 27 in an attempt to maintain a constant distance between them.

Referring in detail to the hydraulic system shown in FIG. 7, in the present instance, a vane-type two pressure pump 70 adapted to deliver pressure fluid at either high pressure and low volume or low pressure and high volume, is employed as a pressure fluid source. The low volume, high pressure side of the pump is shown as 71, while the high volume, low pressure side is shown as 72. It should be understood, however, that other types of pumps may be employed, the present two pressure type being shown merely for purposes of illustration. The pressure fluid discharge side of the pump 70 communicates with a manifold 73 in a conduit junction block 74 through a pressure conduit 75. An adjustable relief valve 76 is provided for the system, comprising a valve spool 77 which is reciprocably mounted in a chamber 78 and serves to relieve the pressure in the system when it exceeds a given value as determined by the valve spool biasing spring 79. This relief valve 76 communicates with the main pressure line 75 by means of a branch conduit 80 so that any excess pressure therein will be relieved through the relief valve and a discharge conduit 81 to a fluid sump 82. From the pressure manifold 73 a pressure conduit 83 leads to a second valve manifold 84 positioned on the support beam 30 for supplying pressure fluid to the various piston and cylinder suspending units 47, and to the positioning valves 66, 67, and thus the tensioning units 53, 54. For purposes of discharging fluid from the tensioning units, the above-described conduit junction block 74 is also provided with an exhaust manifold 85 and with the exhaust conduits 88 from the tensioning units through a common conduit 89.

In order to utilize the high volume, low pressure side 72, of the hydraulic pump 70 when a large volume of fluid is required, a pilot operated unloading valve 90 is provided to control the direction of pressure fluid from the high volume side of the pump. This unloading valve 90 directs the flow of pressure fluid from the high volume, low pressure side of the pump directly through the discharge conduit 81 to the sump 82 when the low volume high pressure side of the pump is adequate for supplying the demands of the system. A solenoid 93 is actuated to move a pilot valve spool 94 when the system requires more volume, to obtain pilot pressure for moving the valve spool 95 of the unloading valve 90 downwardly from the FIG. 7 position to a position in which a high volume fluid conduit 96 from the pump 70 is shut off from the discharge conduit 81 and is placed in communication with the high pressure fluid conduit 96' thereby opening a check valve 97 which is normally closed by the differential in pressure across the same to prevent the entrance into the system of high volume, low pressure fluid.

The tensioning units 53, 54 for carrying the support beam 30, and the headstock assemblies 28, 29 and the cross-rail 27 suspended from the beam, in the manner set forth above, each comprise a cylinder 101, 102 having a piston 103, 104 reciprocably mounted therein so that the piston rod 105, 106 extends upwardly through the end of the cylinder to engage the suspension chains 31, 32, respectively.

In the suspension system the pressure of fluid derived from the pump 70 and applied to the tensioning units 53, 54 is under the control of the positioning valves 66, 67 which are three-way directional control valves. These valves 66, 67 also regulate the discharge of pressure fluid from the cylinders 101, 102 of the tensioning units. Each of these three-way valves comprises a housing having a valve spool 68, 69 reciprocably mounted in a cylindrical chamber therein and provided with a downwardly extending valve stem 64, 65 projecting through the lower portion of the housing. At the opposite end of the valve spool, the stem 64, 65 is provided with a shoulder against which a spring 110, 111 is seated to bias the valve spool downwardly. These valves are of the closed center type in which a cylinder port 114, 115 communicating with a conduit 116, 117 to the chamber of the tensioning unit cylinder above the pistons 103, 104 is closed by the valve spool 68, 69 when the spool is in the center position. Disposed on opposite sides of the cylinder port 114, 115 and communicating with the pressure manifold 84 and the exhaust line 118 are a pressure port and a discharge port, respectively.

It will thus be evident that while the weight suspended from the support beam 30 is constant for a given number of headstocks, the pressure in the tensioning units 53, 54 will vary, depending upon the horizontal position of the headstocks on the cross-rail 27. If, for example, the headstocks 28, 29 are symmetrically placed with respect to the support beam and cross-rail, the fluid pressure in each of the tensioning units will be approximately the same. On the other hand, if the headstocks are traversed along the cross-rail so that they are both at one end, the pressure in the tensioning unit closer to that end will naturally be greater to sustain the increased load. It will readily be noted that as the center of gravity of the headstock means shifts toward one column, the headstock weight acting thereon increases, and reversely.

(c) *Hydraulic circuit for dynamic supports*

As shown in FIG. 7, it is contemplated that the dynamic supports 34, 35 will be supplied with pressure fluid via conduits 119, 120 from the conduits 116, 117, supplying fluid to the tensioning cylinders 101, 102 housed in the respective columns 22, 23. Under this arrangement, the dynamic support pistons 40 are provided with hydraulic fluid, the pressure of which is in accordance with the headstock weight acting on the respective columns.

This may readily be explained by referring to FIG. 7 which illustrates diagrammatically that the tensioning units 53, 54 of the suspension system are fastened to the roller chains 31, 32 carrying the headstock support beam 30. These chains pass over sprockets on the upper extremities of the columns 22, 23, thus transferring the weight of the headstocks to the columns. As previously explained, the fluid operating the tensioning units 53, 54, is supplied at a pressure such that the counterbalancing or lifting force produced by both units together is equal to the weight of the headstocks plus a portion of the weight of the cross-rail. Moreover, this total lifting force is divided between the tensioning units in accordance with the position of the headstocks and, likewise, the distribution of headstock weight.

While the pressure in the lines 116, 117 connected to the tensioning units 53, 54 and the dynamic supports 34, 35 is controlled in the requisite manner for carrying out this invention, the effective area of the dynamic support pistons 40 must be chosen so that the load sustaining force exerted thereby is of such magnitude as to relieve the static supports from the changing load.

Furthermore, the dynamic load supports 34, 35 are positioned under the machine frame in such a manner as to receive the changing weight imposed by the headstocks. That portion of the machine frame which carries the headstocks 28, 29 includes the upstanding column structure, the cross-rail and the rail elevating screws therefor. However, the suspension system as described hereinbefore relieves the rail and rail elevating screws from the weight of the headstocks and transfers this weight to the columns. It has been found that the columns comprise a sufficiently rigid structure so that a dynamic support placed beneath the columns is effective to carry the headstock weight. Therefore, in the present case the dynamic supports may be placed at various locations under the columns, but it has been found preferable to place them under the vertical slideways of the columns. As shown in FIGURE 1, the dynamic supports may be positioned under the outside ways 22', 23', and in this position are effective for the desired purpose. It will be noted that in a machine where no suspension system is employed, and where the rail elevating screws sustain the headstock weight, an appropriate position for the dynamic supports is beneath the rail elevating screws.

COMPUTATION FOR DYNAMIC SUPPORTS (a) *Machine support of FIGS. 1–9*

In this exemplary case, a single dynamic support carries each column 22, 23 although as will be readily evident to a man skilled in the art, it may be preferred or more convenient to use a plurality of dynamic supports to provide the requisite dynamic load bearing characteristics. There follows a typical computation for determining the size of dynamic supports to be so located, where the major units of the machine weigh:

| Component: | Weight, lbs. |
|---|---|
| Headstocks | [1] 7,400 |
| Table | 25,400 |
| Housing | [1] 15,100 |
| Arch | 3,900 |
| Bed | 40,200 |
| Rail | 13,310 |
| Auxiliary feed reel and Counterbalance system | 6,125 |

[1] Each.

The following example omits loads on the frame that are always in balance, such as that of the table, bed, rail and the columns themselves.

Figure 9:
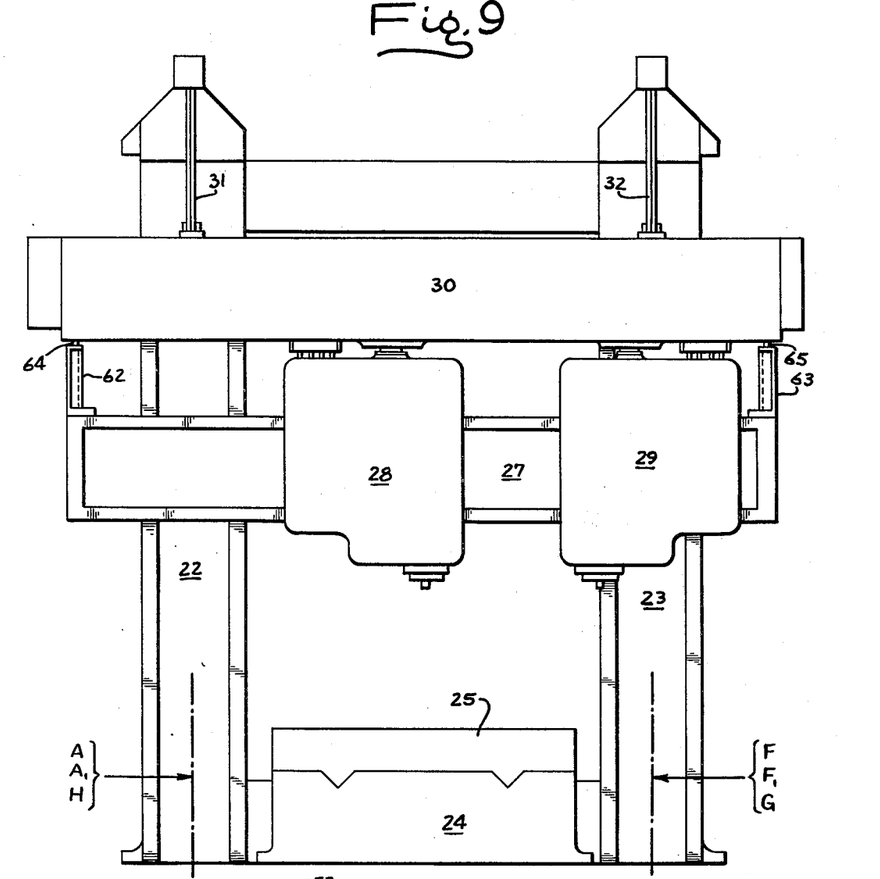

Solving for maximum loads at A and F (FIG. 9) which are located in a plane defined by the axis of the headstocks 28, 29, by summation of moments about the respective points, where the up arrows indicate plus values and the down arrows negative values:

$$F = 16{,}950 \text{ lbs.}\downarrow$$
$$A = 2{,}150 \text{ lbs.}\uparrow$$

Figure 8:
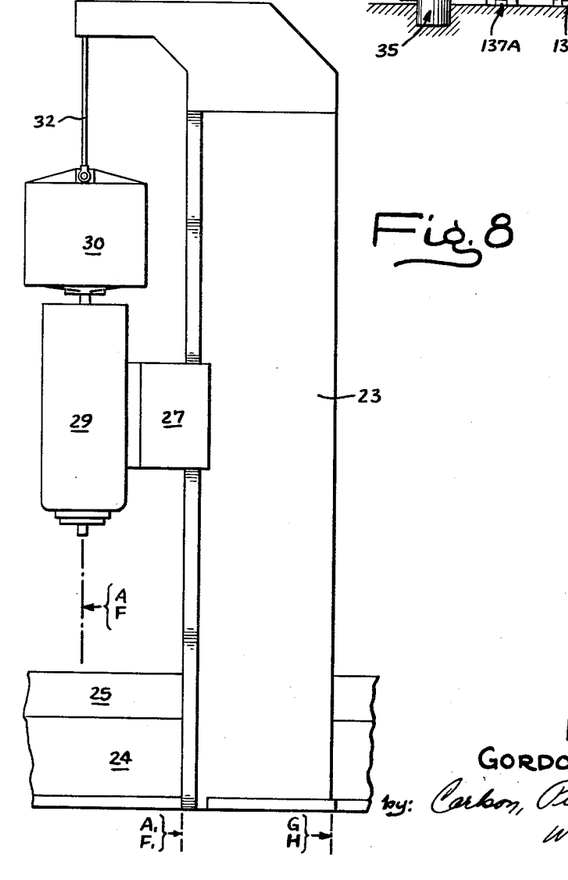
FIGS. 8 and 9 are diagrammatic views of the machine of FIGURE 1, for computation purposes.

Similarly, solving for maximum loads at F' and G, under the front and back edges of the columns, respectively (FIG. 8):

$$F' = 23{,}500 \text{ lbs.}\uparrow$$
$$G = 6{,}550 \text{ lbs.}\downarrow$$

Also, solving for minimum loads A' and H, under the front and back edges of the columns, respectively (FIG. 8):

$$A' = 3{,}040 \text{ lbs.}\downarrow$$
$$H = 890 \text{ lbs.}\uparrow$$

With the illustrated hydraulic system, the pressure in the lines to the dynamic supports varies from a maximum of about 887 p.s.i., to a minimum of about 65 p.s.i. Accordingly, to solve for the area of the dynamic support piston:

Change in load on front edge of housing =

$$23{,}500 + 3{,}090 = 26{,}540$$

Change in pressure in the line $= 887 - 65 = 822$ p.s.i.

$$\text{Piston area} = \frac{\Delta \text{ load}}{\Delta \text{ pressure}} = \frac{26{,}540}{822} = 32.3 \text{ sq. in.}$$

While the foregoing computations apply for a dynamic support 34, 35 positioned under the front edge of the columns 22, 23, as depicted in FIGS. 1–7, similar computations may be carried out for a dynamic support adapted to be located under the rear edge of the columns, where changing load also produces support element and foundation deflections.

Figure 10:
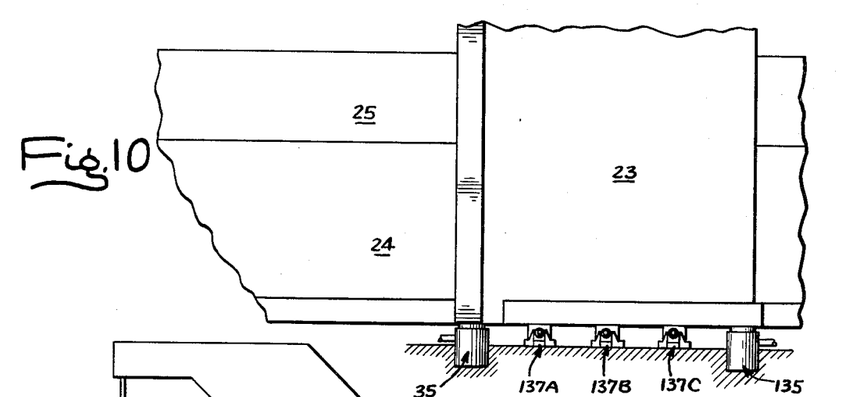
FIG. 10 is an enlarged fragmentary side view of one column of the machine of FIGURE 1, with a modified dynamic support arrangement.

(b) *Machine support of FIG. 10*

Figure 11:
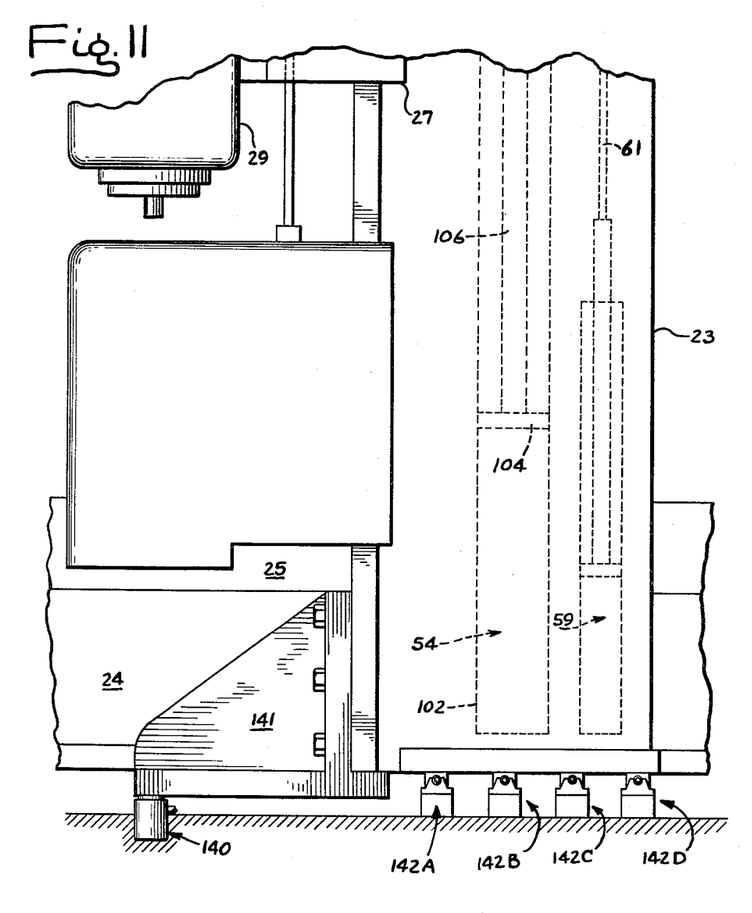
FIG. 11 is an enlarged fragmentary side view of one column of the machine of FIGURE 1, with a further modified dynamic support arrangement.
Figure 12:
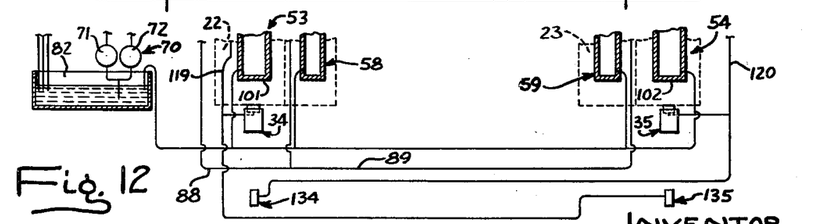
FIG. 12 is a diagram of a portion of the hydraulic system shown in FIG. 7, modified for operating the dynamic support arrangement shown in FIG. 11.

An illustrative machine having dynamic supports 34, 35, 134, 135 under both the front and rear edges of the columns 22, 23, is shown in FIGS. 10 and 11, as a modification of this invention. Herein, leveling blocks 137A–C are employed as static support elements. Where the source of pressure fluid employed is that illustrated in FIGS. 6 and 12, the computation for the area of the dynamic support piston for under the rear edge of the columns 22, 23, follows:

Change in load under rear edge of housing (FIG. 8) =

$$G + H = 6{,}550 + 890 = 7{,}440 \text{ lbs.}$$

$$\text{Piston area} = \frac{\Delta \text{ load}}{\Delta \text{ pressure}} = \frac{7{,}440}{822} = 9.05 \text{ sq. in.}$$

With the dynamic support arrangement as shown in FIG. 10, the hydraulic circuit is connected so that the pressure under the rear piston decreases as the pressure in the front piston increases. Such an arrangement is diagrammatically shown in FIG. 12, where the rear dynamic support units 134, 135 are connected to the opposite suspension system tensioning units 54, 53, respectively, by means of the conduits 120, 119, respectively. In so doing, the rear dynamic supports counterbalance the force couple created by the overhanging or offset relationship of the headstocks 28, 29 relative to the cross-rail 30.

(c) *Machine support of FIG. 11*

This couple may be counteracted, in keeping with a further modification of the invention as shown in FIG. 11, where dynamic support elements 140 are positioned to be effective approximately in line vertically with the headstocks 28, 29. For providing an extension of the base of the column 23 to a point having approximate vertical alinement with the headstocks, and thus to provide bearing means for the dynamic supports, in the present instance a rigid bracket 141 is bolted to the front of the column at the foot. Herein, leveling blocks 142A–D are used as static support elements under the foot of the column.

With this arrangement the dynamic supports 140 are connected as in FIG. 7 to the lines 116, 117 supplying pressure fluid to the tensioning units 53, 54 found in the same columns. The size of the dynamic supports is chosen as described previously in connection with FIGS. 1–9, since the moment of summation about the transverse axis of the machine, as illustrated diagrammatically in FIG. 8, is unchanged by the shift forwardly of the location for the dynamic supports from under the columns to in line with the headstock spindles.

In the usual machine support arrangement, without the dynamic support of this invention, as the load on the leveling blocks changes, due to movement of the headstocks, there is a corresponding change in compressive strain associated with the blocks. Deflections occur in the blocks and in localized areas in the housing and concrete foundation associated with each leveling block. The roughness of the unfinished surfaces of the blocks, housings and concrete foundation aggravates the condition.

Therefore, the invention has been described in terms of sustaining changing or unbalanced load by dynamic supports so as to relieve the static supports from the deflection producing effects of load changes. However, it is also contemplated that under certain circumstances it may be desirable to provide machine frame support by dynamic elements, for loads greater than solely the changing loads. Should it be found, for example, that the machine foundation or columns is deflecting, tipping or settling unduly under operating conditions, it may be desirable to employ over-size dynamic supports, or a plurality thereof, whereby a greater upward pressure may be obtained, and to control the upward force to automatically correct for any deflections that occur.

In keeping with this invention, it is contemplated that machines may be automatically maintained in a level condition, by relieving the static supports from the effects of changing load and counteracting the forces producing deflections as they occur. As applied to machine tools, ultra-precision may be obtained even upon large machines which heretofore have been subject to deflections affecting precision alinements.

I claim as my invention:

1. In a machine, the combination comprising, a frame, a static support under the frame, a movable component carried by the frame and having a center of gravity which shifts relative to said static support, and a dynamic support under the frame spaced from said static support for exerting a variable load sustaining force on the frame which increases as the center of gravity of said component shifts toward said static support and decreases as said component shifts away from said static support, so as to carry the changing load and relieve the static support from the deflection producing effects thereof.

2. In a machine tool adapted to be mounted on a foundation, the combination comprising, a frame, a static support for the frame resting on the foundation, a headstock carried by said frame, said headstock being movable relative to the static support, a dynamic support piston carrying the weight of said headstock via said frame in association with the static support, a cylinder on the foundation and in which said dynamic support piston is received, a source of pressure fluid connected to the cylinder, means for adjusting the pressure in the cylinder, and means connected operatively to said headstock and said frame and responsive to the position of the headstock for actuating said adjusting means so that the pressure in said cylinder and the load sustaining force exerted by the piston is of such magnitude as to carry the changing load due to the movement of the headstock and relieve the static support from the said changing load.

3. In a machine tool adapted to be mounted on a foundation and having an upstanding column structure, a cross-rail supported by the column structure, and headstock means mounting a power driven tool and movable horizontally along said cross-rail; the combination comprising, spaced static supports under the column structure on the foundation and subject to changing load due to movement of the headstock means, a dynamic support piston spaced from said static supports for carrying the column structure in association with said static supports, a foundation supported cylinder for said piston, a source of pressure fluid connected to said cylinder, means for adjusting the pressure in said cylinder, and means operatively connected to said headstock means for actuating said adjusting means in accordance with the horizontal position of the headstock means to make the pressure in said cylinder and the load sustaining force exerted by the piston of such magnitude as to carry the changing load and relieve the static supports from the deflection producing effects thereof.

4. In a machine tool having a pair of spaced upstanding columns spanned by a cross-rail, and headstock means mounting a power driven tool and movable along said cross-rail, the combination comprising, a plurality of spaced static support elements for each of the columns, a dynamic support piston under each column spaced from said static supports therefor for carrying the weight of each column in association with said static support elements therefor, cylinders for said pistons, a source of pressure fluid connected to the cylinders, means for adjusting the pressure in each of the cylinders, and means operatively connected to the headstock means for actuating said adjusting means so that the pressure in each cylinder and the weight sustaining force exerted by the respective piston varies according to the weight acting on the static support elements associated therewith and is of such magnitude as to carry substantially that portion of the weight of the corresponding column attributable to the headstock means, so as to relieve the said associated static support elements from the deflection producing effects due to the changing nature of the load when the headstock means moves along the cross-rail.

5. In a machine tool having a pair of spaced upstanding columns, a cross-rail supported on the front of the columns, and headstock means mounted on the front face of said cross-rail for horizontal movement, the combination comprising, a plurality of spaced static support elements under the foot of each of the columns, a dynamic support piston under the foot at the front of each column for carrying the weight of the column in association with the static support elements therefor, fixed cylinders for said pistons, a source of pressure fluid connected to the cylinders, means for adjusting the pressure in each of the cylinders, and means operatively connected to the headstock means for actuating said adjusting means according to the horizontal position of the headstock means, so that the pressure in each cylinder and the weight sustaining force exerted by the respective piston is of such magnitude as to carry substantially that portion of the weight of the corresponding column attributable to the headstock means, so as to relieve the said associated static support elements from the deflection producing effects due to the changing nature of the load when the headstock means moves along the cross-rail.

6. In a machine tool having a pair of spaced upstanding columns formed with vertical front and rear surfaces, a cross-rail supported on the front surfaces of the columns, and headstock means mounted on the front face of said cross-rail and having a center of gravity which shifts horizontally relative to the columns, said headstock means being carried in offset relation to the front surfaces of the columns, setting up a couple acting thereon, the combination comprising, a plurality of spaced static support elements for each of the columns, a dynamic support piston under the front and one under the rear of each column for carrying the weight of the column in association with the static support elements therefor, front and rear foundation supported cylinders for said pistons, a source of pressure fluid connected to the cylinders, means for adjusting the pressure in each of the cylinders, and means operatively connected to the headstock means for actuating said adjusting means according to the horizontal position of the center of gravity of the headstock means, so that the pressure in each front cylinder increases and the pressure in the corresponding rear cylinder decreases when the center of gravity of the headstock means moves toward the column carried thereby, and reversely, to counteract the couple, and the weight sustaining force exerted by the respective pistons under each column together is of such magnitude as to carry substantially that portion of the weight of the column attributable to the headstock means, so as to relieve the static support elements from the deflection producing effects due to the changing nature of the load when the headstock means moves along the cross-rail.

7. In a machine tool having a pair of spaced upstanding columns, a cross-rail supported on the front of the columns, and headstock means mounted on the front face of said cross-rail and having a horizontally movable center of gravity located on a vertical axis offset from the front of the columns, the combination comprising, a plurality of static support elements for each of the columns, a dynamic support piston for carrying the weight of each column in association with the static support elements therefor, said piston being arranged substantially in vertical alinement with a point in the path of horizontal movement of the center of gravity of the headstock means to counteract the couple resulting from the offset relation thereof, connections between said pistons and said columns, cylinders for said pistons, a source of pressure fluid connected to the cylinders, means for adjusting the pressure in each of the cylinders, and means operatively connected to the headstock means for actuating said adjusting means according to the distribution of headstock weight between the columns as determined by the horizontal position of the center of gravity of the headstock means, to make the pressure in each cylinder and the force exerted by the respective pistons of such magnitude as to carry substantially that portion of the weight of the corresponding column attributable to the headstock means, so as to relieve the static support elements from the deflection producing effects due to the changing nature of the load when the headstock means moves along the cross-trail.

8. In a machine tool adapted to be mounted on a foundation and having a pair of spaced upstanding columns spanned by a cross-rail, and headstock means mounting a power driven tool and movable along said cross-rail, so that the center of gravity thereof shifts horizontally relative to the columns, the combination comprising, a pair of spaced apart suspension elements transferring the weight of the headstock means to the columns, means for dynamically supporting the weight of said headstock means including a counterbalance associated with each suspension element for taking up the weight of the headstock means and including a fixed cylinder and a movable piston connected to the respective suspension element, a plurality of spaced static supports for each of the columns, said dynamic support means also including a dynamic support piston for carrying the weight of each column in association with the static supports therefor, foundation supported cylinders for said dynamic support pistons, a source of pressure fluid connected to the counterbalance and the dynamic support cylinders, means for adjusting the pressure in each of the cylinders, and means operatively connected to the headstock means for actuating said adjusting means so that the pressure in each cylinder and the weight sustaining force exerted by the respective piston varies according to the horizontal position of the center of gravity of the headstock means and is of such magnitude as to carry the apportioned weight of the headstock means, so as to relieve the static supports from the changing load when the headstock means moves along the cross-rail and to maintain the cross-rail in a horizontal position on the columns.

9. In a machine having an upstanding member and a component horizontally and vertically movable thereon and having a center of gravity shiftable horizontally relative to the member, the combination comprising, a pair of spaced apart suspension elements secured to the headstock means on opposite horizontal sides of the center of gravity thereof, means for dynamically supporting the weight of said headstock means including a counterbalance associated with each suspension element for taking up the weight of the headstock means, a static support for the member, said dynamic support means also including a dynamic support carrying the member in association with the static support, and means for operating said counterbalances and said dynamic support according to the horizontal position of the center of gravity of the headstock means so that the weight sustaining forces of the counterbalances and the dynamic support is substantially the same and of such magnitude as to compensate for unbalance of the headstock means on the member and to relieve the static support from the deflection producing effects of changing load.

10. In a machine tool adapted to be mounted on a foundation, the combination comprising, a frame including spaced vertical members spanned by a cross-beam, means for adjusting said cross-beam to different vertical positions on said members, static supports in said foundation under said frame, headstock means movable along said cross-beam so that the center of gravity thereof shifts horizontally relative to said vertical members, and a dynamic support in said foundation under each of said spaced members for carrying the changing load on said members due to the movement of said headstock means and relieve the static supports therefrom.

11. In a machine tool, the combination comprising, a frame, means for carrying said frame including a static support and a dynamic support located at spaced points under said frame and exerting a sustaining force on the frame, movable headstock means carried by said frame, said headstock means having a center of gravity which shifts relative to said spaced points of support under operating conditions so as to impose a variable load upon said supports, and means for operating said dynamic support so that the sustaining force exerted thereby is of such magnitude as to carry the changing load and relieve the static support from the deflection producing effects thereof.

References Cited in the file of this patent

UNITED STATES PATENTS

| | | |
|---|---|---|
| 2,208,804 | Pfauter | July 13, 1940 |
| 2,648,999 | Stephan | Aug. 18, 1953 |
| 2,696,763 | Daugherty et al. | Dec. 14, 1954 |
| 2,759,378 | Youssoufian et al. | Aug. 21, 1956 |
| 2,899,869 | Daugherty | Aug. 18, 1959 |